United States Patent
Hatton

[15] 3,665,687
[45] May 30, 1972

[54] BLOWER ATTACHMENT FOR REEL TYPE LAWN MOWER

[72] Inventor: Jay T. Hatton, 5120 S.E. Johnson Creek Boulevard, Portland, Oreg. 97206

[22] Filed: May 28, 1971

[21] Appl. No.: 147,786

[52] U.S. Cl. ................................56/12.9, 56/249, 56/199
[51] Int. Cl. .......................................A01d 35/24
[58] Field of Search..................56/12.8, 13.4, 157, 158, 153, 56/202, 198, 199, 501, 503, 504

[56] References Cited

UNITED STATES PATENTS

| | | |
|---|---|---|
| 1,134,443 | 4/1915 | Engle......................................56/12.9 |
| 2,026,291 | 12/1935 | Tirimacco...............................56/13.3 |
| 2,710,516 | 6/1955 | Kaesemeyer, Jr. et al................56/158 |
| 2,827,749 | 3/1958 | Patten......................................56/128 |
| 3,165,874 | 1/1965 | Osteen......................................56/23 |

*Primary Examiner*—Russell R. Kinsey
*Attorney*—Buckhorn, Blore, Klarquist & Sparkman

[57] ABSTRACT

A reel type lawn mower has a blower mounted on a platform forwardly of the reel and an outlet adapted to discharge air transversely substantially along the full length of the reel, tangentially thereto, and generally parallel to the plane of the cutting blade. By this means, grass cut by the action of the reel on the blade is blown rearwardly into a grass receiving basket disposed beneath the mower handle.

4 Claims, 4 Drawing Figures

Patented May 30, 1972  3,665,687

JAY T. HATTON
INVENTOR

BY
BUCKHORN, BLORE, KLARQUIST & SPARKMAN
ATTORNEYS

BLOWER ATTACHMENT FOR REEL TYPE LAWN MOWER

BACKGROUND OF THE INVENTION

This invention relates to lawn mower attachments, and more particularly to a blower attachment adapted for use with a reel type lawn mower and which is suitable for blowing grass cut by the action of the reel on the mower blade rearwardly into a receiving basket depending from the mower handle.

A problem with reel type lawn mowers is that grass cut thereby tends to pile up on the roller in front of the grass catcher and be deposited back on the lawn. The problem is particularly acute with wet grass.

Accordingly, it is the primary object of the present invention to provide a reel type lawn mower with means to facilitate the depositing of cut grass in the basket attached rearwardly thereof.

A further object of the present invention is to provide such a reel type lawn mower with means to position the grass so that it will be in the optimum position to be cut by the action of the reel on the blade.

SUMMARY OF THE INVENTION

A reel type lawn mower is provided with blower means mounted on a platform forwardly of the reel and driven by the mower motor. Air outlet means are provided for the blower and such outlet means are positioned forwardly of the cutting reel to discharge air transversely substantially along the full length thereof. The air is discharged substantially tangentially to the reel and generally parallel to the plane of the cutting blade. By this means, grass cut by the action of the reel on the blade is blown rearwardly into a grass receiving basket at the back of the mower.

DETAILED DESCRIPTION OF PREFERRED EMBODIMENT

Figure 1:
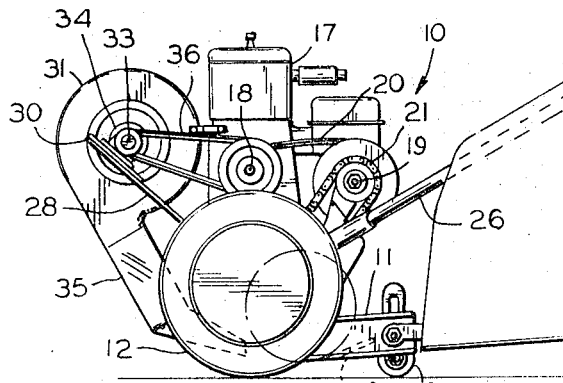
FIG. 1 is a side elevational view of a reel type lawn mower provided with the blower means of the present invention.
Figure 2:
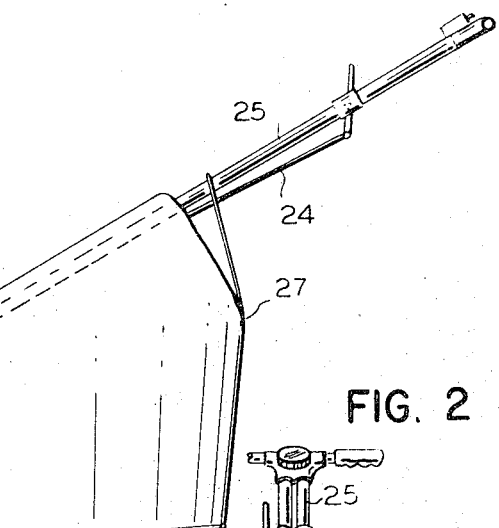
FIG. 2 is a front elevational view of the blower of FIG. 1.
Figure 3:
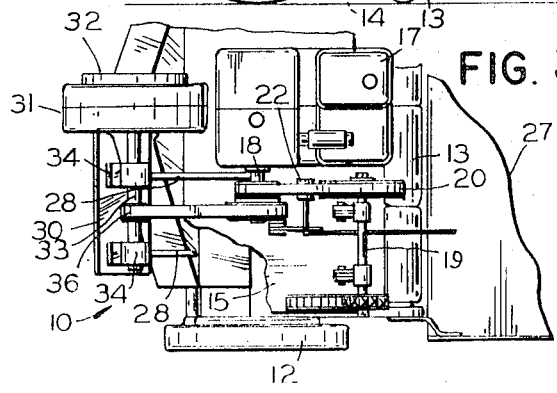
FIG. 3 is a plan view of part of the lawn mower shown in FIGS. 1 and 2.
Figure 4:
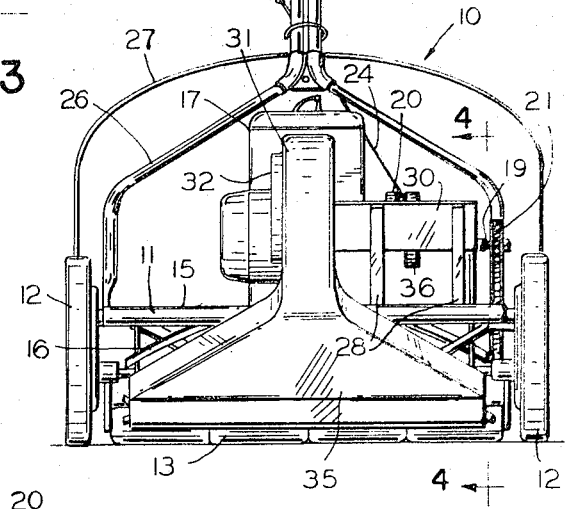
FIG. 4 is a sectional view taken on line 4—4 of FIG. 2.
Figure 4:
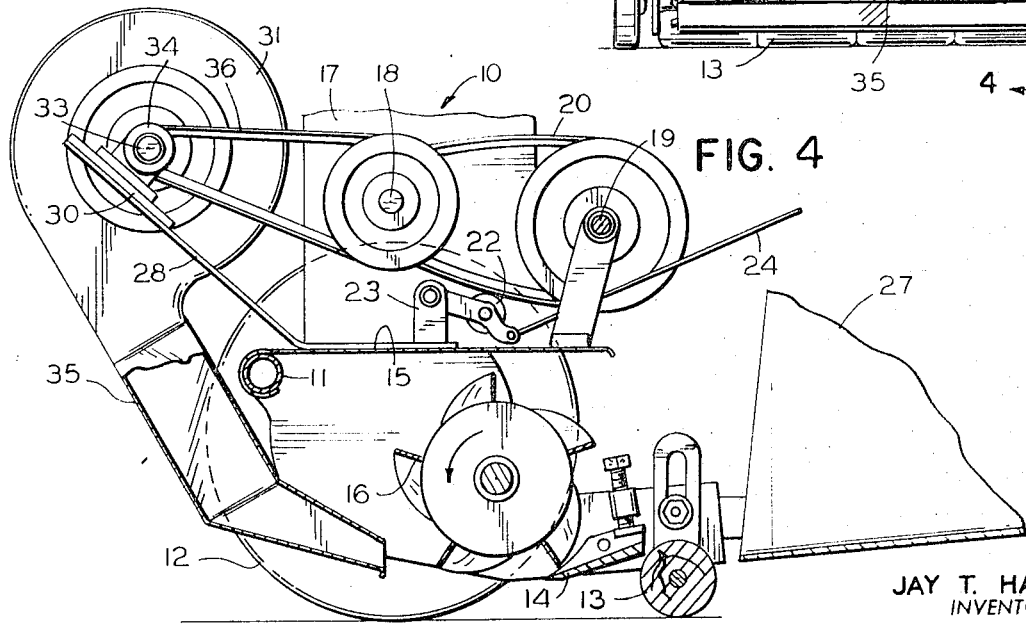

With reference to the drawings, the reel type lawn mower 10 illustrated has a frame 11 supported on wheels 12 and ground engaging rollers 13 secured to the frame 11 rearwardly of the wheels. A ledger cutting blade 14 is carried by the frame 11 at the lower side of the latter, a platform 15 is supported on the frame 11 above the blade 14, and a cutting reel 16 is journaled in the frame 11 between the cutting blade 14 and the platform 15 operatively to engage the blade 14 to cut grass therebetween.

A gasoline engine 17 mounted on the platform 15 powers an engine drive shaft 18. A jack shaft 19 journaled on the platform 15 and connected to the engine drive shaft 18 by a belt 20 drives the reel 16 through a chain drive 21 between the shaft 19 and the reel. A belt tightener 22 pivotally attached to a bracket 23 mounted on the platform 15 and actuated by an operating rod 24 attached to the mower handle 25 selectively tightens the belt drive 20 drivingly to connect the reel 16 to the shaft 18.

Shaft 19 is disposed substantially parallel to the blade 14 and to the rotational axis of the reel 16. The latter optionally may be drivingly connected to the wheels 12 by suitable gear means, not illustrated, to propel the mower. The handle 25 is disposed above and to the rear of the rollers 13 being attached to the frame 11 by a fork or bracket 26. A grass receiving basket 27 is attached to the frame 11 beneath the handle 25, being disposed rearwardly of the blade 14 to receive grass cut thereby.

A feature of the invention resides in the blower means mounted on the platform 15 forwardly of the reel 16. A pair of supporting brackets 28 attached to the platform 15 support a mounting plate 30 on their forward ends. A blower housing 31 containing a fan unit (not shown) is mounted on the plate 30. The housing 31 is provided with an air inlet 32 as shown. The fan is driven by means of a shaft 33 journaled in bearings 34 mounted on the plate 30, the shaft 33 being driven from the engine drive shaft 18 by a belt drive 36.

An outlet or nozzle 35 communicates with the blower housing 31, depending therefrom. The nozzle 35 is positioned forwardly of the reel 16 and extends substantially transversely the full length thereof so as to discharge air across the full length of the reel. The nozzle is also positioned to discharge air rearwardly substantially tangentially to the bottom of the reel 16 and generally parallel to the plane of the blade 14. Thus the nozzle 35 directs a stream of air against the grass as it is cut and thrown upwardly by the coaction of the reel on the blade. As the grass is cut, the stream of air blows it directly into the basket 27.

The action of the nozzle 35 in directing the air substantially tangential to the reel 16 and generally in the plane of the cutting blade 14 also tends to make the grass stand up just before it is cut by the action of the reel on the blade. This facilitates cutting and makes the lawn mower more efficient.

The stream of air discharged through the nozzle 35 is particularly effective in blowing the grass into the back of the basket 27. A porous cloth cover for the top of the basket may be optionally used to prevent the grass from being blown out of the top of the basket.

The combination of the more effective cutting position of the grass and the quick discharge of the cuttings from the reel results in a lawn mower equipped as hereinabove described going a long time between sharpenings, and this has been a most unexpected result of this invention.

I claim:

1. In combination with a reel type lawn mower having a wheel supported frame;
   a platform mounted on said frame;
   motor means mounted on said platform;
   a ledger cutting blade carried by said frame below said platform;
   a cutting reel journaled in said frame between said blade and said platform and driven by said motor means, said cutting reel being operatively associated with said cutting blade;
   a grass receiving basket attached to said frame, said basket being disposed rearwardly of said blade to receive grass cut thereby;
   blower means mounted on said platform and means for driving said blower means;
   air inlet means for said blower means; and
   air outlet means for said blower means and adapted to receive air therefrom, said air outlet means being positioned forwardly of said cutting reel and discharging air transversely substantially along the full length thereof, said air outlet means being positioned to discharge said air substantially tangentially to said reel and generally parallel to the plane of said cutting blade to blow grass cut by the action of said reel on said blade rearwardly into said basket.

2. The combination of claim 1 in which said blower means is mounted on said platform forwardly of said reel, said air outlet means depending from said blower means.

3. The combination of claim 1 in which said air outlet means comprise a nozzle extending transversely substantially the full length of said cutting reel.

4. The combination of claim 1 in which said air outlet means discharges said air tangentially to the bottom of said cutting reel.

* * * * *